(12) United States Patent
Kawamura et al.

(10) Patent No.: US 10,174,782 B2
(45) Date of Patent: Jan. 8, 2019

(54) STRUCTURE FOR PREVENTING FALLING OF FASTENING NUT OF PORTABLE POWER WORKING MACHINE, AND METHOD FOR ATTACHING FASTENING NUT TO COVER

(71) Applicant: YAMABIKO CORPORATION, Tokyo (JP)

(72) Inventors: Kunimune Kawamura, Tokyo (JP); Kazuhiro Umetani, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 221 days.

(21) Appl. No.: 15/368,379

(22) Filed: Dec. 2, 2016

(65) Prior Publication Data

US 2017/0175797 A1 Jun. 22, 2017

(30) Foreign Application Priority Data

Dec. 17, 2015 (JP) ................................ 2015-246206

(51) Int. Cl.
*F16B 39/38* (2006.01)
*F16B 37/00* (2006.01)
*F16B 41/00* (2006.01)

(52) U.S. Cl.
CPC .............. *F16B 39/38* (2013.01); *F16B 37/00* (2013.01); *F16B 41/002* (2013.01)

(58) Field of Classification Search
CPC .......... F16B 37/00; F16B 37/08; F16B 39/10; F16B 39/24; F16B 39/38; F16B 41/002
(Continued)

(56) References Cited

U.S. PATENT DOCUMENTS 2,631,633 A * 3/1953 Peckham ................ F16B 39/26
411/134
4,463,630 A * 8/1984 Turner ................. B23D 63/166
76/41
(Continued)

FOREIGN PATENT DOCUMENTS

JP 2015-55288 A 3/2015

OTHER PUBLICATIONS

Extended European Search Report dated May 16, 2017 issued in connection with the corresponding European Appln No. 16202442.6 (4 Pages).

*Primary Examiner* — Roberta S Delisle
(74) *Attorney, Agent, or Firm* — Lucas & Mercanti, LLP (57) ABSTRACT

A structure for preventing the falling of a fastening nut of a portable power working machine that can reliably prevent loss of the nut while suppressing the production and component costs, allows for easy operation of attaching a nut anchor member to a cover, and can increase the maintenance property, suppress damage and failures, increase the durability, and reduce the size and weight; and a method for attaching the fastening nut to a cover are provided. The structure includes a nut locking member, which is inserted through a bolt insertion hole from a back surface side of a cover so that movement of the nut locking member to a front surface side is prevented, and has a split cylindrical shape with elastically deformable leg-like piece portions; an anchoring cylindrical portion with a predetermined length functioning as a nut anchor member, the anchoring cylindrical portion being provided in a protruding manner and coaxially with the nut on a seating surface side, being adapted to be inserted through the bolt insertion hole, and being relatively difficult to elastically deform with respect to the nut locking member. A protruding end of the anchoring cylindrical portion of the nut has formed continuous there- (Continued)

with a hook portion that bends inward along its entire periphery. Each end of the leg-like piece portion of the nut locking member has formed continuous therewith a locking claw portion that bends outward to lock the hook portion.

11 Claims, 9 Drawing Sheets

(58) Field of Classification Search
  USPC .................. 411/190, 260, 352, 353, 432
  See application file for complete search history.

(56) References Cited

U.S. PATENT DOCUMENTS

| | | | | |
|---|---|---|---|---|
| 5,611,654 | A * | 3/1997 | Frattarola | F16B 37/065 411/173 |
| 6,554,555 | B2 * | 4/2003 | Imahigashi | H01Q 1/1214 411/149 |
| 7,278,809 | B2 * | 10/2007 | Aukzemas | F16B 5/0208 411/108 |
| 7,326,017 | B2 * | 2/2008 | Winker | F16B 37/00 411/533 |
| 7,658,582 | B2 * | 2/2010 | Doubler | F16B 21/16 411/353 |
| 8,132,484 | B2 * | 3/2012 | Pfleiderer | B27B 17/02 30/383 |
| 8,615,889 | B2 | 12/2013 | Martinsson | |
| 2005/0129483 | A1 * | 6/2005 | McAfee | F16B 5/0208 411/353 |
| 2006/0231285 | A1 | 10/2006 | Bisson et al. | |
| 2015/0068048 | A1 | 3/2015 | Yoneyama et al. | |

* cited by examiner

STRUCTURE FOR PREVENTING FALLING OF FASTENING NUT OF PORTABLE POWER WORKING MACHINE, AND METHOD FOR ATTACHING FASTENING NUT TO COVER

CROSS-REFERENCE TO RELATED APPLICATION

The present application claims priority from Japanese patent application JP 2015-246206 filed on Dec. 17, 2015, the content of which is hereby incorporated by reference into this application.

BACKGROUND

Technical Field

The present invention relates to a structure for preventing the falling of a fastening nut of a portable power working machine, and a method for attaching the fastening nut to a cover. For example, the present invention relates to a structure for preventing the falling of a fastening nut of a portable power working machine in which the fastening nut is threadably engaged with a bolt embedded in a body portion, which houses a power source such as an engine or an electric motor, a power transmission mechanism, and the like, so as to compressively hold a guide bar, with a saw chain extended around the guide bar, between the body portion and a cover. The present invention also relates to a method for attaching the fastening nut to the cover.

Background Art

For example, a chain saw, which is a type of portable power working machine, typically includes a body portion housing a power source such as an engine or an electric motor, a power transmission mechanism, and the like; a cover attached to cover a predetermined region of the body portion (such as the power transmission mechanism portion including a drive sprocket); a guide bar held between the body portion and the cover and having a saw chain extended around the guide bar; bolts passed through an elongated hole or an elongated groove provided in the guide bar and through insertion holes provided in the cover, the bolts being securely embedded in the body portion; and fastening nuts threadably engaged with the bolts so as to compressively hold the guide bar between the body portion and the cover.

During the use of the chain saw, the saw chain may become elongated by heat, friction, and the like, becoming loose. Thus, the saw chain needs to be re-tensioned from time to time. Also, when the saw chain or the guide bar is replaced, the tension of the saw chain needs to be adjusted after the saw chain is extended around the drive sprocket and the guide bar.

In order to adjust the tension of the saw chain, replace the guide bar, or maintain and check sliding portions, for example, it may become necessary to detach the cover from the body portion, requiring loosening the nuts and removing them from the bolts.

Once removed from the bolts, the nuts are separate from the body portion or the cover. Thus, the nuts may be easily lost, particularly during a logging operation in the mountains, for example. If the nuts are lost, the cover cannot be attached to the body portion, making it impossible to compressively hold the guide bar between the body portion and the cover.

Conventionally, structures for preventing the falling of fastening nuts have been proposed, as described in Patent Documents 1 to 3, for example, where the fastening nuts each have a nut anchor member for anchoring the nut to a cover so as to prevent the nut from falling from the cover when the nut is detached from the bolt.

The structure for preventing the falling of a fastening nut described in Patent Document 1 includes a circular portion externally held on the lower outer periphery of the nut by swaging; three downwardly extending leg-like piece portions extending downward from the circular portion and inserted through locking insertion holes formed on the outer side of the bolt insertion hole in the cover; and bifurcated locking claw portions provided at the bottom ends of the leg-like piece portions. The front-side ends (top ends) of the locking insertion holes in the cover are provided with locking portions (opening holes formed narrower than the locking insertion holes so as to lock the claw portions) for locking the bifurcated locking claw portions.

The structure for preventing the falling of a fastening nut described in Patent Document 2 includes an anchoring cylindrical portion with a predetermined length, which is provided in a protruding manner and coaxially with the nut on the seating surface side and is adapted to be inserted through a bolt insertion hole provided in a cover; and a hook portion, which bends outward along its entire periphery and is continuous with the protruding end (bottom end) of the anchoring cylindrical portion. A locking portion (an opening hole with a smaller diameter than that of the bolt insertion hole) for locking the hook portion is provided at an end (top end) of the bolt insertion hole on the front surface side in the cover so that the anchoring cylindrical portion with the hook portion functions as a nut anchor member.

The structure for preventing the falling of a fastening nut described in Patent Document 3 was proposed earlier by the applicant of the present invention. Specifically, the structure includes a nut anchor member made of a single elastic wire or the like, and the nut anchor member includes a split ring-shaped portion externally retained on the outer periphery of the nut and configured to prevent the fall from the nut while permitting rotation relative to the nut, a pair of left and right downwardly extending leg-like piece portions continuous with opposite ends of the split ring-shaped portion, and hook piece portions continuous with bottom portions of the leg-like piece portions. The cover includes a locking portion configured to lock the hook piece portions.

RELATED ART DOCUMENTS

Patent Documents

Patent Document 1: U.S. Pat. No. 8,615,889 B
Patent Document 2: U.S. Pat. No. 8,132,484 B
Patent Document 3: JP 2015-55288 A

SUMMARY

However, the structures for preventing the falling of fastening nuts described in Patent Documents 1 to 3 have the following problems.

That is, in the structure for preventing the falling of a fastening nut described in Patent Document 1, swaging is required to have the nut anchor member externally retained on the lower outer periphery of the nut. Therefore, the production cost, or component cost tends to increase. There is also a problem with the durability such that the bifurcated locking claw portions (or in particular, the protruding claw portions thereof) tend to be readily damaged. Meanwhile, increasing the strength of the bifurcated locking claw portions can make it difficult to attach the nut to a cover, whereas increasing the elasticity of the bifurcated locking claw portions to increase the attaching property can decrease the durability or cause fall by mistake and the like.

With regard to the structure for preventing the falling of a fastening nut described in Patent Document 2, when the nut anchor member (anchoring cylindrical portion) is attached to the cover, the anchoring cylindrical portion (or its hook portion that bends outward) needs to be passed through the opening hole with a smaller diameter than that of the bolt insertion hole provided in the cover by narrowing the anchoring cylindrical portion, for example. However, as the hook portion is provided around the entire periphery of the anchoring cylindrical portion, special tools and the like are required for the operation of attaching the nut anchor member to the cover such as the operation of narrowing the anchoring cylindrical portion. Therefore, there are problems in that the attaching operation cannot be performed easily, the cost for the attachment increases, and the maintenance property decreases, for example. Further, there are also problems with the durability such that the locking portion (an opening hole with a smaller diameter than that of the bolt insertion hole) for locking the hook portion tends to be readily damaged.

With regard to the structure for preventing the falling of a fastening nut described in Patent Document 3, as the nut anchor member is produced from a single elastic wire or the like, and as the attaching operation for anchoring the nut can be conducted by utilizing the elastic deformation of the nut anchor member, it is possible to suppress the production cost of the nut anchor member and easily conduct the attaching operation therefor without the need for special tools and the like. However, as it is necessary to provide a flange portion and the like for having the nut anchor member externally retained on the nut, there are problems in that that the outside diameter of the nut including the flange portion and the like is increased, and the production cost of the nut is also increased.

The present invention has been made in view of the foregoing, and it is an object of the present invention to provide a structure for preventing the falling of a fastening nut of a portable power working machine that can reliably prevent loss of the nut while suppressing the production cost and component cost, and that allows for easy operation of attaching the nut anchor member to the cover, and that can also increase the maintenance property, suppress damage, failures, and the like, increase the durability, and reduce the size and weight; and a method for attaching the fastening nut to a cover.

In order to achieve the aforementioned object, the present invention provides a structure for preventing the falling of a fastening nut of a portable power working machine including a body portion, a cover attached to cover a predetermined region of the body portion, a guide bar held between the body portion and the cover, a bolt passed through an elongated hole or an elongated groove provided in the guide bar and through a bolt insertion hole provided in the cover, the bolt being securely embedded in the body portion, and a fastening nut threadably engaged with the bolt so as to compressively hold the guide bar between the body portion and the cover. The structure includes a nut locking member, the nut locking member being elastically deformable and adapted to be inserted through the bolt insertion hole from a back surface side of the cover so that movement of the nut locking member to a front surface side is prevented; and a nut anchor member provided on the nut on a seating surface side thereof, the nut anchor member being adapted to be inserted through the bolt insertion hole and being relatively difficult to elastically deform with respect to the nut locking member. The nut anchor member includes a hook portion formed continuous therewith. The nut locking member includes at least one locking claw portion formed continuous therewith, the locking claw portion being adapted to allow the hook portion to be locked by the nut locking member.

More specifically, the present invention provides a structure for preventing the falling of a fastening nut of a portable power working machine including a body portion, a cover attached to cover a predetermined region of the body portion, a guide bar held between the body portion and the cover, a bolt passed through an elongated hole or an elongated groove provided in the guide bar and through a bolt insertion hole provided in the cover, the bolt being securely embedded in the body portion, and a fastening nut threadably engaged with the bolt so as to compressively hold the guide bar between the body portion and the cover. The structure includes a nut locking member, the nut locking member having an elastically deformable cylindrical shape or an elastically deformable split cylindrical shape, and being adapted to be inserted through the bolt insertion hole from a back surface side of the cover so that movement of the nut locking member to a front surface side is prevented; and an anchoring cylindrical portion with a predetermined length functioning as a nut anchor member, the anchoring cylindrical portion being provided in a protruding manner and coaxially with the nut on a seating surface side, being adapted to be inserted through the bolt insertion hole, and being relatively difficult to elastically deform with respect to the nut locking member. A protruding end of the anchoring cylindrical portion of the nut has formed continuous therewith a hook portion that bends inward along its entire periphery. An end of the nut locking member has formed continuous therewith at least one locking claw portion that bends outward to lock the hook portion.

The nut locking member preferably has a split cylindrical shape with a plurality of leg-like piece portions, and each leg-like piece portion has formed at an end thereof the locking claw portion.

Each leg-like piece portion of the nut locking member is preferably adapted to be opposite and in contact with the bolt.

According to another preferred aspect, the nut locking member has a step formed thereon, and the nut anchor member is adapted to be externally arranged on a smaller-diameter portion of the nut locking member.

According to still another preferred aspect, an end of the nut locking member is located at the same height as an end of the bolt insertion hole on the front surface side.

According to further another preferred aspect, an end of the nut locking member is adapted to protrude upward beyond an end of the bolt insertion hole on the front surface side.

An end of the nut locking member on a back surface side preferably has formed thereon a flange portion for preventing the falling of the nut locking member, the flange portion having a larger diameter than a minimum inner diameter of the bolt insertion hole.

The nut locking member is preferably fixed to the cover.

Each of the hook portion and the locking claw portion preferably has one of an L-shaped, chevron-shaped, or arcuate cross-section.

According to another preferred aspect, the nut anchor member is adapted to slide on an inner peripheral surface of the bolt insertion hole when the nut is loosened or fastened.

In addition, the present invention also provides a method for attaching a fastening nut of a portable power working machine to a cover, the portable power working machine including a body portion, the cover attached to cover a predetermined region of the body portion, a guide bar held between the body portion and the cover, a bolt passed through an elongated hole or an elongated groove provided in the guide bar and through a bolt insertion hole provided in the cover, the bolt being securely embedded in the body portion, and a fastening nut threadably engaged with the bolt so as to compressively hold the guide bar between the body portion and the cover, the method including disposing a hook portion formed continuous with a nut anchor member, which is provided on the nut on a seating surface side thereof, is adapted to be inserted through the bolt insertion hole, and is relatively difficult to elastically deform with respect to a nut locking member, which is elastically deformable and is adapted to be inserted through the bolt insertion hole from a back surface side of the cover so that movement of the nut locking member to a front surface side is prevented, at a position below a locking claw portion that is formed continuous with the nut locking member, while warping the nut locking member, thereby allowing the hook portion to be locked by the locking claw portion.

In the present invention, not only loss of the nut can be reliably prevented, but also it is possible to allow the hook portion, which is provided on the anchoring cylindrical portion, to be locked by the locking claw portion, which is provided on the nut locking member, by disposing the hook portion on the side below the locking claw portion while warping the nut locking member inward. This is because the nut locking member made of a sheet metal, which can be produced relatively inexpensively, is disposed on the cover side; the anchoring cylindrical portion, which functions as a nut anchor member, is provided on and integrally with the bottom side of the body portion of a common nut; the hook portion that bends inward is provided on the anchoring cylindrical portion, for example; and at least one locking claw portion, which bends outward, for locking the hook portion is provided on the nut locking member. Therefore, in comparison with the conventional structures for preventing the falling of fastening nuts described in Patent Documents 1 to 3, it is possible to suppress the production cost and component cost, and it is also possible to easily conduct the operation of attaching the nut with the anchoring cylindrical portion, which forms the nut anchor member, to the cover without the need for special tools and the like, which can also improve the maintenance property. Further, as both the anchoring cylindrical portion and the nut locking member are made of metals, there are advantages in that damage, failure, and the like can hardly occur, the durability can be increased, and reductions in the size and weight are achieved.

In addition, there is another advantage in that the strength of the hook portion of the nut anchor member can be increased as compared to that of the conventional structure in which attachment is conducted by deforming the nut anchor member. Herein, after the nut locking member is once attached to the nut anchoring member, the nut locking member will not move or deform by being sandwiched between the bolt and the cover. Therefore, even if the nut locking member is provided with elasticity that is necessary for the attachment, there will be no adverse effect after completion of the attachment.

DETAILED DESCRIPTION

Hereinafter, embodiments of the present invention will be described with reference to the drawings.

First Embodiment

Figure 1:
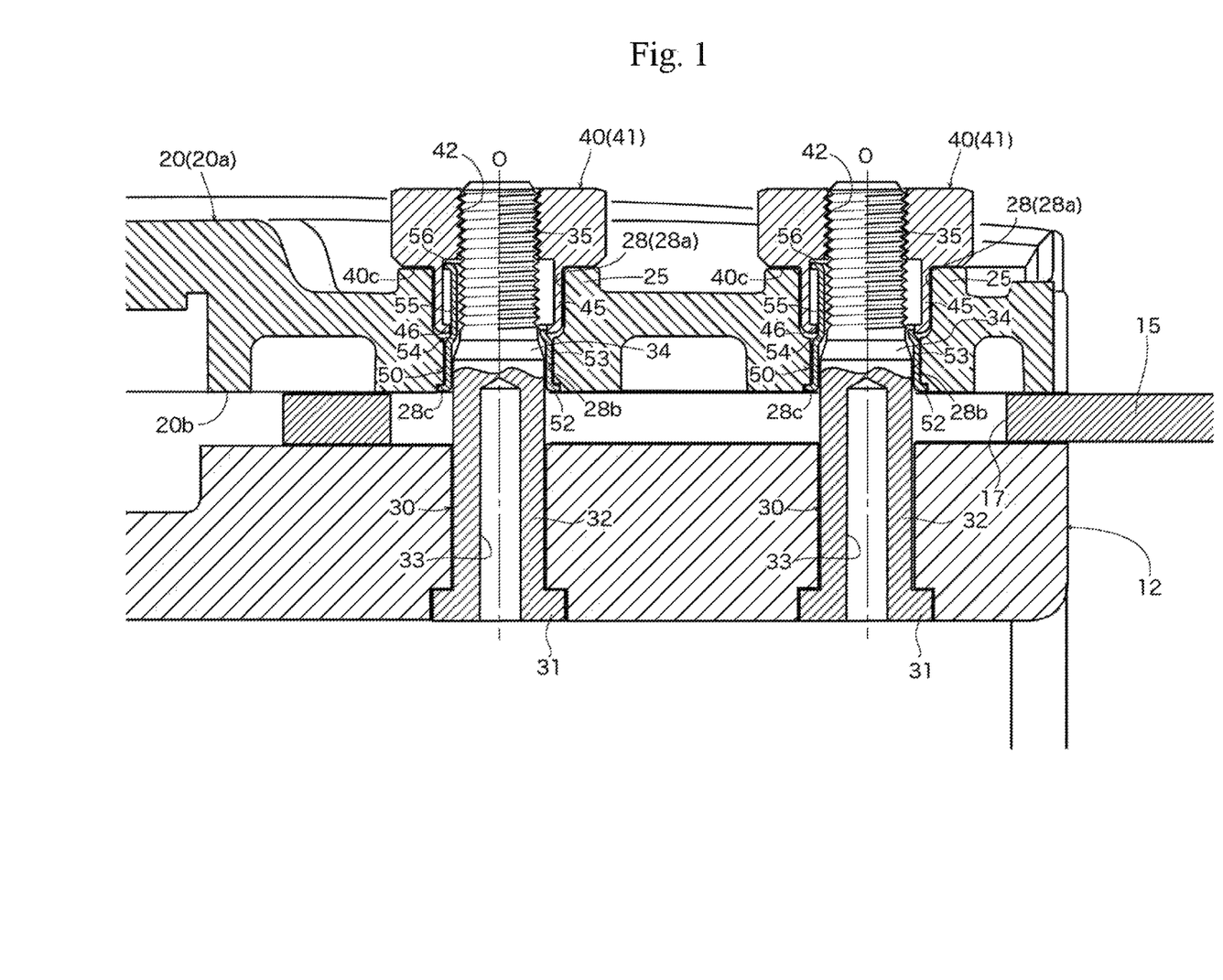
FIG. 1 is a cross-sectional view showing the primary part of a chain saw as a portable power working machine to which the first embodiment of the structure for preventing the falling of a fastening nut in accordance with the present invention is applied.

FIG. 1 is a cross-sectional view showing the primary part of a chain saw as a portable power working machine to which the first embodiment of the structure for preventing the falling of a fastening nut in accordance with the present invention is applied. It should be noted that FIG. 1 corresponds to FIG. 4A of Patent Document 3 described above that was filed by the applicant of the present invention. In addition, in each drawing, a female screw thread portion 42 of a nut 40, a male screw thread portion 35 of a bolt 30, and the like may sometimes be depicted in a simplified manner or an exaggerated manner to help understand the present invention or for the convenience of drawing the figures.

The chain saw illustrated by way of example herein includes a body portion 12 (of which only a part of a right side portion is depicted herein) having a power source such as an engine or an electric motor, a power transmission mechanism, and the like; a cover (e.g., sprocket guard) 20 attached to cover a predetermined region (such as the power transmission mechanism portion including a drive sprocket) of the body portion 12; a guide bar 15 held between the body portion 12 and the cover 20 and around which a saw chain is extended; two bolts 30 passed through an elongated hole 17 provided in the guide bar 15 and through two bolt insertion holes 28 provided in the cover 20, the bolts being securely embedded, one fore and the other aft, in the right side portion of the body portion 12 at a predetermined interval; and two fastening nuts 40 threadably engaged with the respective bolts 30 so as to compressively hold the guide bar 15 between the body portion 12 (the right side portion thereof) and the cover 20.

Each bolt insertion hole 28 has a larger-diameter hole 28a on the front surface side (top surface side) of the cover 20 and a smaller-diameter hole 28b on the back surface side (bottom surface side) of the cover 20. An end on the back surface side (bottom end) of the smaller-diameter hole 28b is provided with a fitting recessed portion 28c that has a larger diameter than that of the smaller-diameter hole 28b and into which a flange portion 52 for preventing the falling of a nut locking member 50 described below, which is provided at the bottom end of the nut locking member 50, is adapted to be fitted.

Each bolt 30 is a commonly used bolt with steps, and is securely embedded in the body portion 12 by press fitting or the like. The bolt 30 includes, sequentially from the bottom side, a rectangular flange portion 31, a larger-diameter shaft portion 32 with a hollow portion 33, a stepped portion 34 with a truncated cone shape, and a male screw thread portion 35 with a predetermined thread diameter and length, as can be clearly seen in FIG. 3B in addition to FIG. 1. It should be noted that the hollow portion 33 in the larger-diameter shaft portion 32 may be omitted.

Figure 2A:
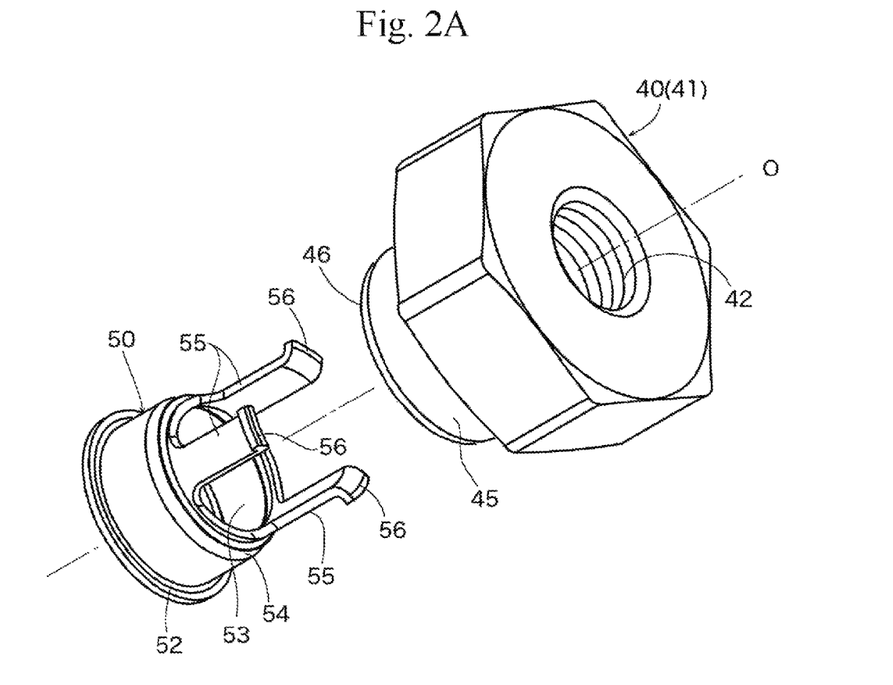
FIG. 2A is an exploded top perspective view of the nut and the nut locking member used in the first embodiment shown in FIG. 1.
Figure 2B:
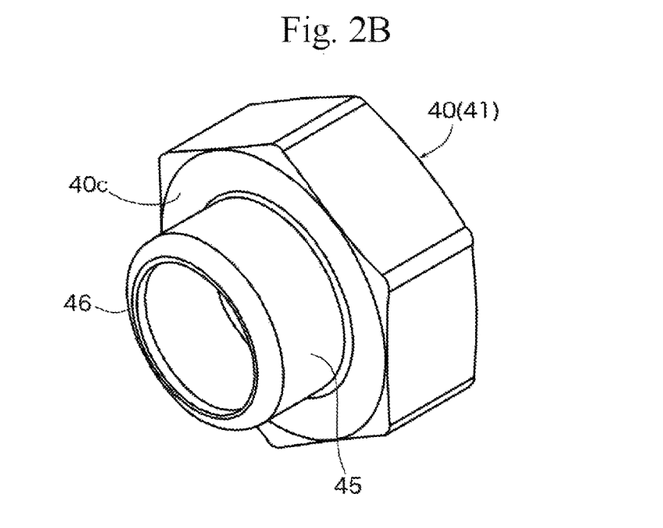
FIG. 2B is a bottom perspective view of the nut.
Figure 3A:
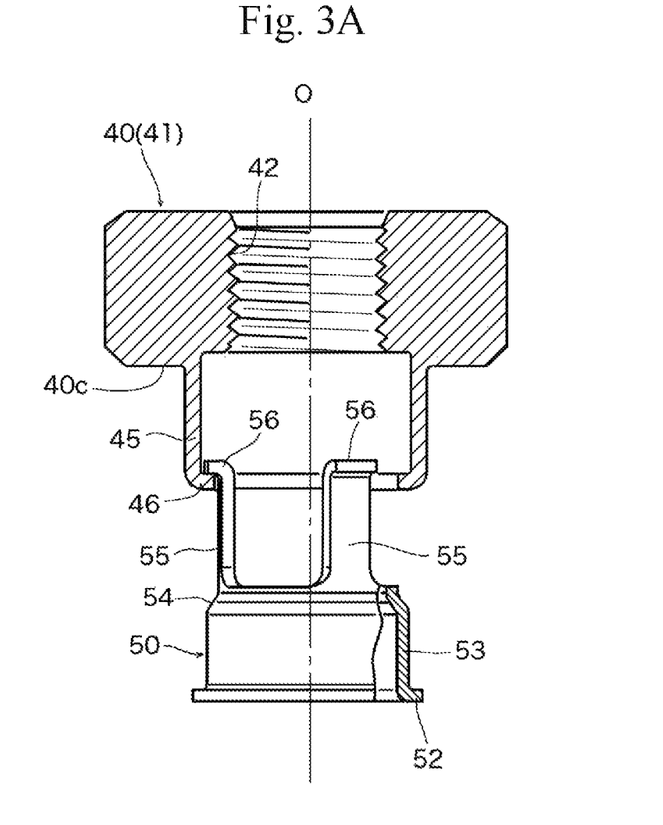
FIG. 3A is a partially cut side view of the nut and the nut locking member used in the first embodiment shown in FIG. 1.
Figure 3B:
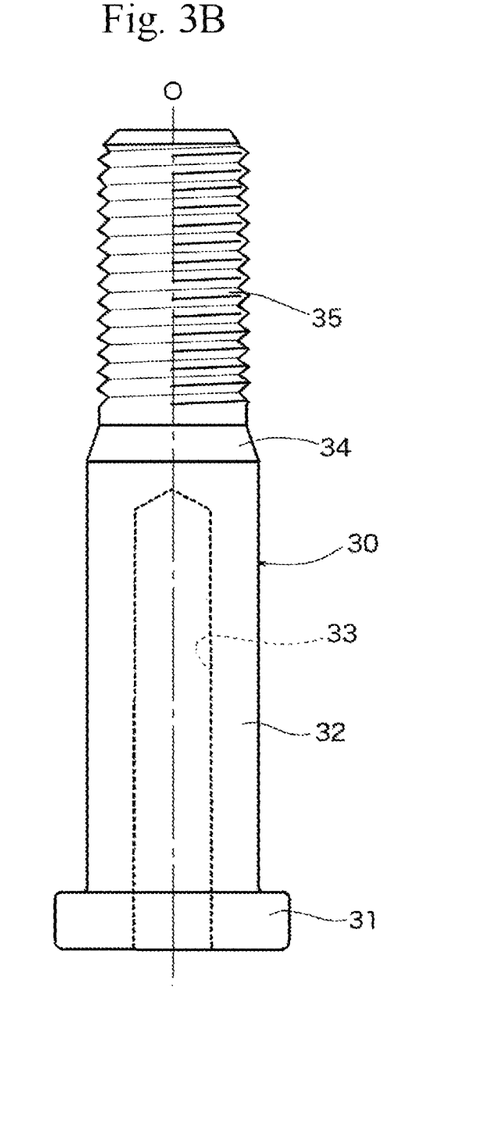
FIG. 3B is a side view of the bolt.

Each fastening nut 40 is, as depicted in FIGS. 2A, 2B, and 3A, a nut obtained by providing an anchoring cylindrical portion 45, which serves as a nut anchoring member, on the bottom side of a body portion 41 of a common hexagonal nut that has a female screw thread portion 42 with the same thread diameter and the same thread effective length as those of the bolt 30. Specifically, the anchoring cylindrical portion 45 with a predetermined length, which is adapted to be slidably inserted through the bolt insertion hole 28 (or the larger-diameter hole 28a thereof) and be externally arranged on three leg-like piece portions 55 provided on the top side of the nut locking member 50 described below, is provided in a protruding manner and coaxially with the nut 40 on the seating surface 40c side (along the center line O of each part). In addition, a hook portion 46 that bends inward along its entire periphery is also formed continuous with the protruding end (bottom end) of the anchoring cylindrical portion 45. The hook portion 46 is formed by, for example, bending the bottom end of the anchoring cylindrical portion 45 inward from the outer side during the production of the nut 40.

In addition to the aforementioned configuration, in the present embodiment, the nut locking member 50 made of a sheet metal is arranged on the cover 20 side in order to anchor the nut 40 to the cover 20. The nut locking member 50 is produced through sheet metal working, such as press forming, and has an elastically deformable, split cylindrical shape so that the nut locking member 50 can be inserted through the bolt insertion hole 28 from the back surface 20b side of the cover 20 while the movement of the nut locking member 50 to the front surface 20a side is prevented, as can be clearly seen in FIGS. 2A and 3A in addition to FIG. 1. Specifically, the nut locking member 50 includes, sequentially from the back surface 20b side, the flange portion 52 for preventing the falling of the nut locking member, which is adapted to be fitted in the fitting recessed portion 28c provided at an end of the cover 20 on the back surface 20b side; a cylindrical portion 53 on the back surface side that is adapted to be securely fitted in the smaller-diameter hole 28b on the back surface side (bottom surface side) of the bolt insertion hole 28 by press fitting or the like and be externally arranged on the larger-diameter shaft portion 32 of the bolt 30; a stepped portion 54 corresponding to the stepped portion 34 of the bolt 30; and the three leg-like piece portions 55 (portions with a smaller diameter than that of the cylindrical portion 53 on the back surface side of the nut locking member 50 with steps), the three leg-like piece portions 55 extending perpendicularly upward from the stepped portion 54 so as to be opposite and in contact with the lower portion of the male screw thread portion 35 of the bolt 30, being adapted to be inserted through the anchoring cylindrical portion 45 of the nut 40, and being formed equiangularly (at intervals of 120° herein). In addition, the tip end of each leg-like piece portion 55 has formed continuous therewith a locking claw portion 56 that bends outward to lock the hook portion 46 provided on the anchoring cylindrical portion 45 of the nut 40. Each of the hook portion 46 and the locking claw portions 56 has an L-shaped, chevron-shaped, or arcuate cross-section. Herein, the top end (locking claw portion 56) of each leg-like piece portion 55 of the nut locking member 50 is located at approximately the same height as the top surface of a seat 25 of the cover 20 (that is, the top end of the larger-diameter hole 28a of the bolt insertion hole 28).

According to the present embodiment, the two bolts 30 are securely embedded in the right side portion of the body portion 12, one fore and the other aft, at a predetermined interval. As the two bolts 30 are configured to be threadably engaged with the respective fastening nuts 40, the "structure for preventing the falling of a fastening nut" in accordance with the present invention is applied to two locations of the chain saw. It should be noted that the number of each of the bolts 30 and the fastening nuts 40 threadably engaged with the bolts 30 may also be one or more than two.

Figure 4:
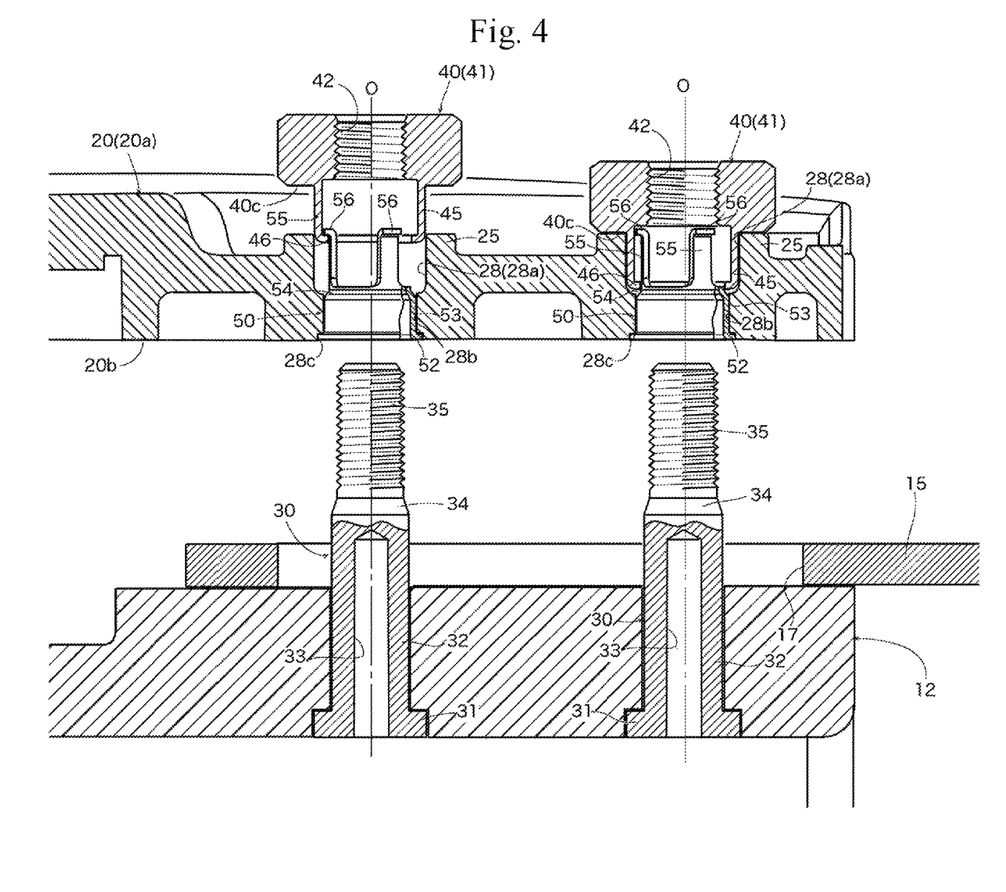
FIG. 4 is a cross-sectional view used for the illustration of the attachment of the cover to the body portion of the chain saw in the first embodiment shown in FIG. 1.

The attaching operation for anchoring the nut 40 to the cover 20 (operation of engaging the hook portion 46 of the anchoring cylindrical portion 45 with the side below the locking claw portions 56 of the nut locking member 50) utilizes the elasticity of the leg-like piece portions 55 of the nut locking member 50 that is fixed (immovably) to the cover 20. That is, as shown in FIG. 4, in the state in which the cover 20 is detached from the body portion 12, for example, two of the three leg-like piece portions 55 (portions that can elastically deform relatively easily (have high elasticity) with respect to the anchoring cylindrical portion 45) are warped inside such that the two locking claw portions 56 are pressed against the inner end of the hook portion 46 of the anchoring cylindrical portions 45 (a portion that is relatively difficult to elastically deform (has low elasticity) with respect to the nut locking member 50; herein, a portion that cannot elastically deform). Accordingly, a gap that can pass the hook portion 46 therethrough is formed between the locking claw portions 56 of the two leg-like piece portions 55 and the upper end of the larger-diameter hole 28a of the bolt insertion hole 28. Therefore, the nut 40 is slightly tilted with respect to the center line O, for example, to allow the hook portion 46 to be pressed to the side below the locking claw portions 56 through the gap. Accordingly, the two leg-like piece portions 55 restore their original positions of extending perpendicularly upward due to the elasticity restoring force. After that, when the hook portion 46 is pressed to the side below the other locking claw portion 56 in a manner described above, the hook portion 46 can be locked by the locking claw portions 56 as shown in FIG. 4. Accordingly, the operation of attaching the nut 40 to the cover 20 is completed.

In the following, the operations of the attaching the cover 20 to the body portion 12 and fastening the nut 40 will be described. When the cover 20 is attached to the body portion 12, the cover 20 is first put close to the body portion 12 such that the bolt insertion holes 28 (or the nut locking members 50 fixed thereto) on the cover 20 side are externally arranged on the two respective bolts 30 that are securely embedded in the body portion 12. Then, the lower end of the female screw thread portion 42 of the nut 40, which is anchored to the cover 20 (or the nut locking member 50 thereof), is pressed against the upper end of the male screw thread portion 35 of each bolt 30, and then, each nut 40 is turned in the fastening direction (e.g., clockwise direction). This causes the female screw thread portion 42 of the nut 40 to be threadably engaged with the male screw thread portion 35 of the bolt 30, so that the nut 40 can descend while being rotated through threaded feeding until the seating surface 40c of the nut 40 eventually abuts the top surface of the seat 25 of the cover 20. From such a state, as the nut 40 is further turned for tighter fastening, the guide bar 15 is compressively held between the body portion 12 and the cover 20 (the state shown in FIG. 1). During the operation of fastening the nut 40, the anchoring cylindrical portion 45 descends together with the nut 40 while sliding on the larger-diameter hole 28a of the bolt insertion hole 28. That is, the larger-diameter hole 28a (or the inner peripheral surface thereof) also serves the function of a guiding surface during the operation of fastening or loosening the nut 40.

Figure 5:
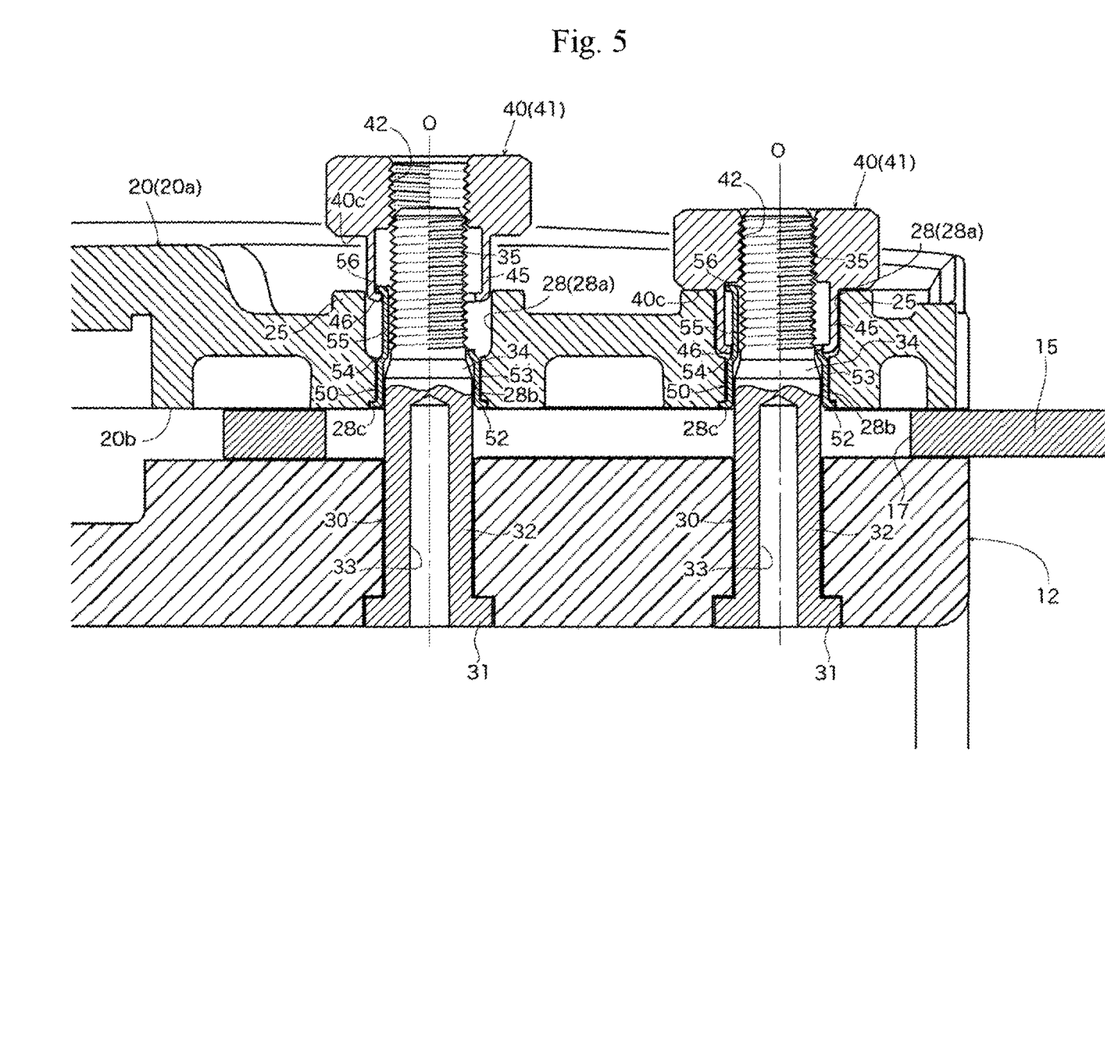
FIG. 5 is a cross-sectional view used for the illustration (Example 1) of the detachment of the cover from the body portion of the chain saw in the first embodiment shown in FIG. 1.
Figure 6:
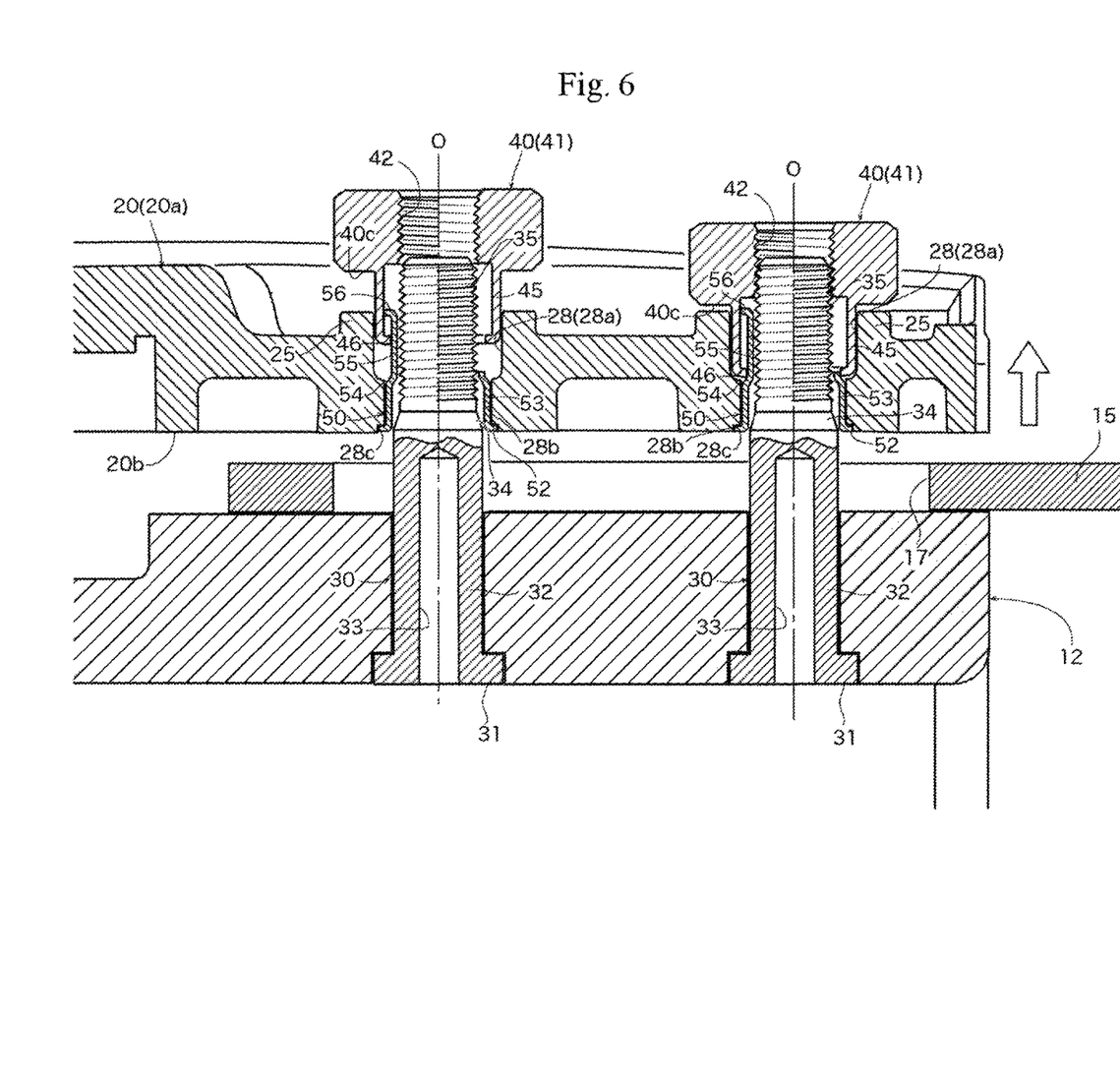
FIG. 6 is a cross-sectional view used for the illustration (Example 2) of the detachment of the cover from the body portion of the chain saw in the first embodiment shown in FIG. 1.

Meanwhile, when the cover 20 is detached from the body portion 12, the nut 40 is turned in the loosening direction (e.g., anticlockwise direction) from the fastened state shown in FIG. 1. Accordingly, the nut 40 ascends by being rotated through threaded feeding (loosening movement) as shown in FIG. 5. Specifically, for example, the cover 20 can be detached from the body portion 12 by, after loosening the nut 40 on the left side to a certain extent as shown in FIG. 5, appropriately loosening the nut 40 on the right side in the fastened state and separating the entire cover 20 including the two nut locking members 50 from the body portion 12 to a certain extent as shown in FIG. 6, and thereafter, further loosening the nuts 40 on the left and right sides to release the threadably engaged state between the nuts 40 and the bolts 30.

According to the aforementioned structure for preventing the falling of the fastening nut in the present embodiment, even when the cover 20 is detached from the body portion 12, the hook portion 46 of the anchoring cylindrical portion 45 provided on each nut 40 can be locked by the locking claw portions 56 of the nut locking member 50 provided on the cover 20 side, that is, the nut 40 is anchored to the cover 20. Therefore, loss of the nut 40 can be reliably prevented.

In addition, not only loss of the nut 40 can be reliably prevented as described above, but also it is possible to allow the hook portion 46, which is provided on the anchoring cylindrical portion 45, to be locked by the locking claw portions 56, which are provided on the nut locking member 50, by disposing the hook portion 46 on the side below the locking claw portions 56 while warping the leg-like piece portions 55 provided on the nut locking member 50 inward. This is because the nut locking member 50 made of a sheet metal, which can be produced relatively inexpensively, is disposed on the cover 20 side; the anchoring cylindrical portion 45 functioning as a nut anchor member, which is relatively difficult to elastically deform with respect to the nut locking member 50, is provided on and integrally with the bottom side of the body portion 41 of a common hexagonal nut; the hook portion 46 that bends inward is provided on the anchoring cylindrical portion 45; and the locking claw portions 56, which bend outward, for locking the hook portion 46 are provided on the nut locking member 50. Therefore, in comparison with the conventional structures for preventing the falling of fastening nuts described in Patent Documents 1 to 3, it is possible to suppress the production cost and component cost, and it is also possible to easily conduct the operation of attaching the nut 40 with the anchoring cylindrical portion 45, which forms the nut anchor member, to the cover 20 without the need for special tools and the like, which can also improve the maintenance property. Further, as both the anchoring cylindrical portion 45 and the nut locking member 50 are made of metals, there are advantages in that damage, failure, and the like can hardly occur, and excellent durability is thus ensured.

Further, as it is possible to ensure the strength of the anchoring cylindrical portion 45 that forms the nut anchor member as well as reduce the length of the anchoring cylindrical portion 45, there are advantages in that deformation, damage, and the like of the nut anchor member can be suppressed as compared to the conventional structures, and the size and weight of the nut 40 can also be reduced.

Second Embodiment

Figure 7:
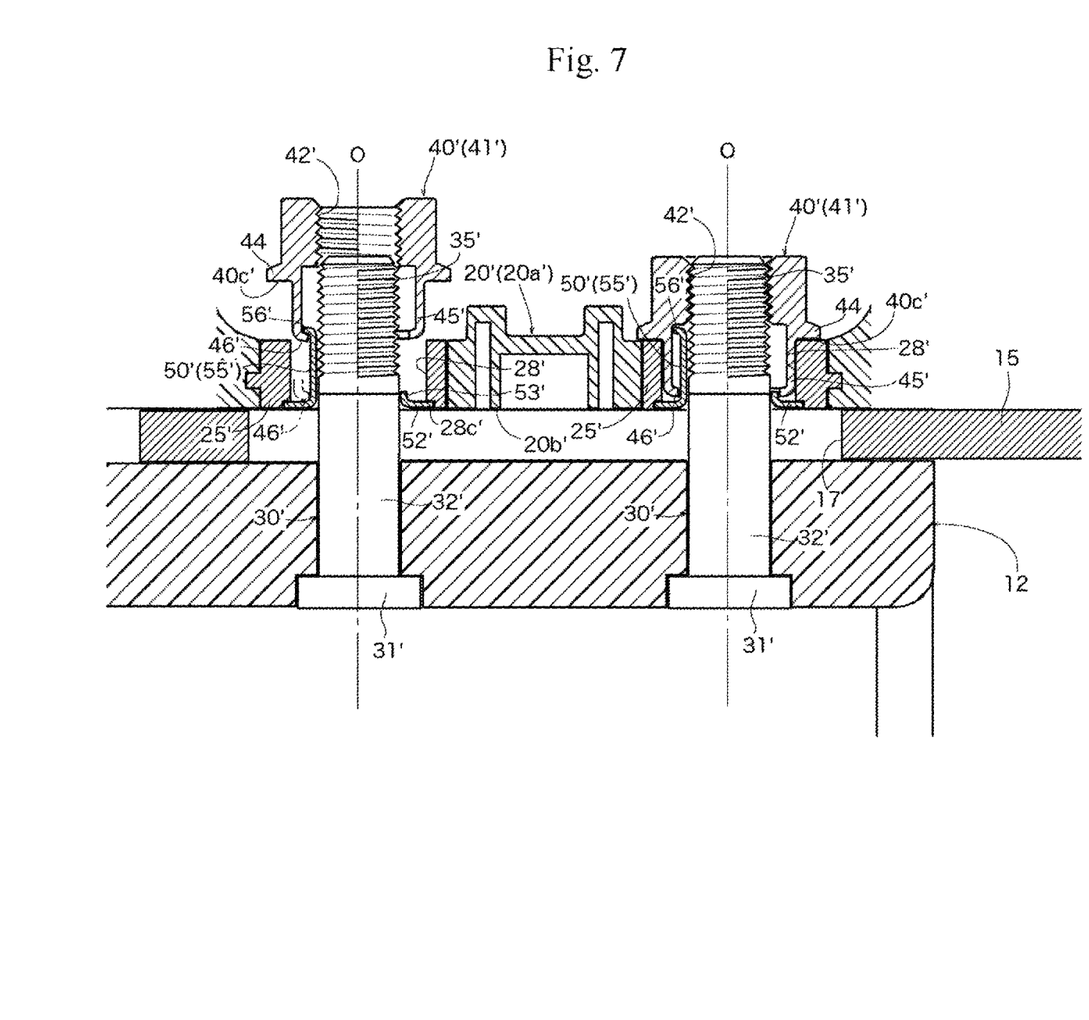
FIG. 7 is a cross-sectional view showing the primary part of a chain saw as a portable power working machine to which the second embodiment of the structure for preventing the falling of a fastening nut in accordance with the present invention is applied.
Figure 8:
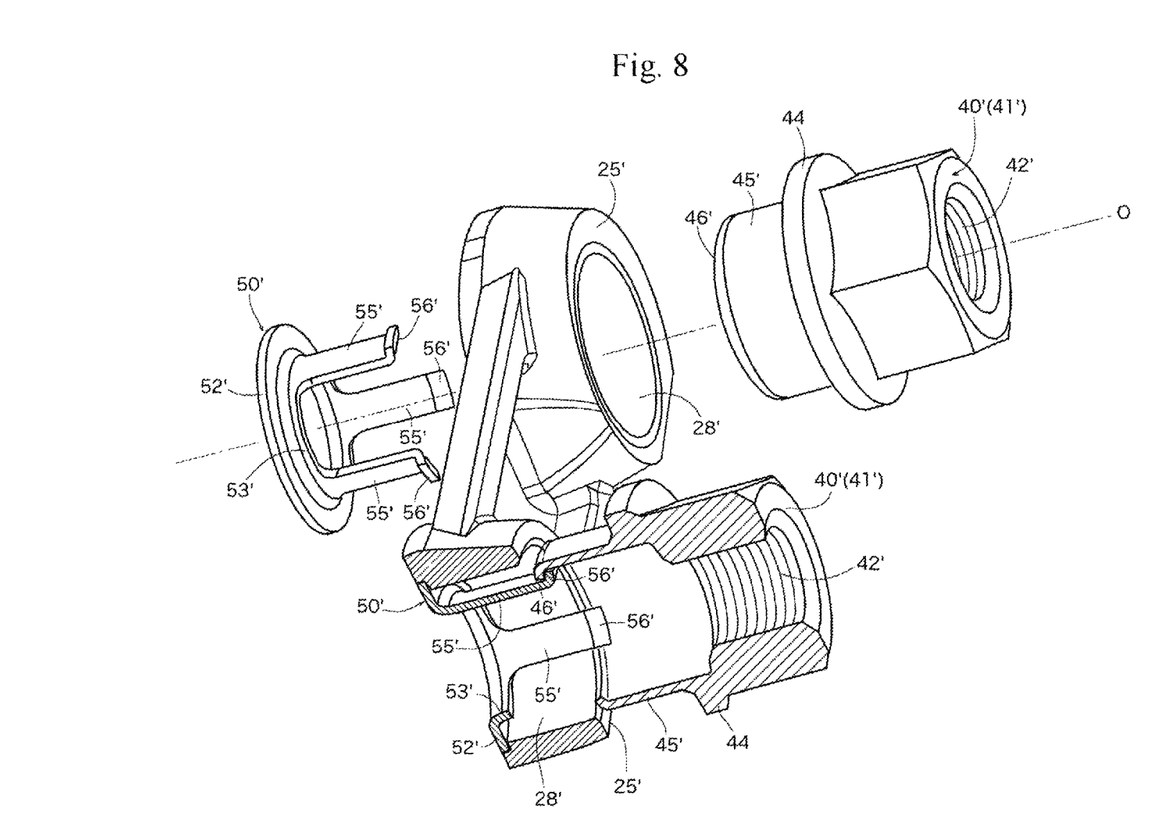
FIG. 8 is an exploded perspective view of the nut with the anchoring cylindrical portion, the nut locking member, and the seat member of the cover that are used in the second embodiment shown in FIG. 7.

FIG. 7 is a cross-sectional view showing the primary part of a chain saw as a portable power working machine to which the second embodiment of the structure for preventing the falling of a fastening nut in accordance with the present invention is applied. FIG. 8 is an exploded perspective view showing a nut with an anchoring cylindrical portion, a nut locking member, and a seat member of a cover that are used in the second embodiment shown in FIG. 7. In FIGS. 7 and 8 illustrating the second embodiment, portions corresponding to those shown in FIGS. 1 to 6 illustrating the first embodiment are denoted by the same reference numerals or the same reference numerals with "'(prime mark),"' and repeated explanation is omitted. Hereinafter, differences will be mainly described.

In the structure for preventing the falling of a fastening nut in accordance with the second embodiment, reductions in the size and weight of a bolt 30', a nut 40' with an anchoring cylindrical portion 45', a nut locking member 50', and the like are basically attempted.

That is, the bolt 30' is a common straight bolt, and includes, sequentially from the bottom side, a rectangular flange portion 31', a shaft portion 32', and a male screw thread portion 35' with a smaller thread diameter and length than those in the first embodiment.

In addition, a seat member 25', which is made of metal and has formed therein a straight bolt insertion hole 28' with a fitting recessed portion 28c', is integrally coupled to the cover 20' (or the body portion thereof) through insertion molding or the like. The left and right seat members 25' are coupled together in the form of eyeglasses (see FIG. 8).

The fastening nut 40' has a flange portion 44 for increasing the seating surface area on the bottom side of a hexagonal nut portion 41' that is smaller than the hexagonal nut portion of the first embodiment and has a female screw thread portion 42' with the same thread diameter as that of the bolt 30'. In addition, the anchoring cylindrical portion 45' functioning as a nut anchor member is provided on the bottom side of the flange portion 44. Specifically, the anchoring cylindrical portion 45' with a predetermined length, which is adapted to be slidably inserted through the bolt insertion hole 28' and be externally arranged on three leg-like piece portions 55' provided on the nut locking member 50' described below, is provided in a protruding manner and coaxially with the nut 40' on the seating surface 40c' side (along the central line O of each part). In addition, the hook portion 46' that bends inward along its entire periphery is provided continuous with the protruding end (bottom end) of the anchoring cylindrical portion 45'.

In addition to the aforementioned configuration, in this embodiment, the nut locking member 50' made of sheet metal is disposed on the cover 20' side to anchor the nut 40' to the cover 20'. The nut locking member 50' is produced through sheet metal working, such as press forming, as in the first embodiment, and has an elastically deformable, split cylindrical shape to allow the nut locking member 50' to be inserted through the bolt insertion hole 28' from the back surface 20b' side of the cover 20' and prevent the movement of the nut locking member 50' to the front surface 20a' side. Specifically, the nut locking member 50' includes, sequentially from the back surface 20b' side, a flange portion 52' for preventing the falling of the nut locking member 50', which is adapted to be fitted in the fitting recessed portion 28c' provided at an end of the seat member 25' on the back surface 20b' side; an ultrashort cylindrical portion 53'; and the three leg-like piece portions 55' that extend perpendicularly upward from the ultrashort cylindrical portion 53' so as to be opposite and in contact with the shaft portion 32' and the male screw thread portion 35' of the bolt 30', are adapted to be inserted through the anchoring cylindrical portion 45' of the nut 40', and are formed equiangularly (herein, at intervals of) 120°. A locking claw portion 56', which bends outward to lock the hook portion 46' provided on the anchoring cylindrical portion 45' of the nut 40', is formed continuous with the tip end of each leg-like piece portion 55'.

Herein, the nut locking member 50' in the present embodiment does not have a portion that is securely fitted in the bolt insertion hole 28' (that is, the nut locking member 50' is not fixed to the cover 20') unlike in the first embodiment, and the flange portion 52' for preventing the falling of the nut locking member 50' is fitted in the fitting recessed portion 28c', whereby falling of the nut locking member 50' upward is prevented. It should be noted that even in such a case, the flange portion 52' for preventing the falling of the nut locking member 50' of the nut locking member 50' may be securely fitted in the fitting recessed portion 28c' of the bolt insertion hole 28' by press fitting or the like. In addition, the top end (locking claw portion 56') of each leg-like piece portion 55' of the nut locking member 50' protrudes upward beyond the top surface of the seat member 25' (that is, the top end of the bolt insertion hole 28').

In the second embodiment with such a configuration, the attaching operation for anchoring the nut 40' to the cover 20' is conducted by utilizing the elasticity of the leg-like piece portions 55' of the nut locking member 50' as in the first embodiment. However, in the present embodiment, as the top ends (locking claw portions 56') of the nut locking member 50' protrude upward beyond the top surface of the seat member 25', it is possible to easily warp the leg-like piece portions 55' inward and thus conduct the attaching operation more easily than in the first embodiment.

In addition, although the attachment of the cover 20' to the body portion 12 is carried out by fastening the nut 40' as in the first embodiment, with regard to the detachment of the cover 20' from the body portion 12, the cover 20' can be detached from the body portion 12 by, for example, by loosening one of the nuts 40' and thus releasing the threadably engaged state between the nut 40' and its corresponding bolt 30' and then loosening the other nut 40' and thus releasing the threadably engaged state between the nut 40' and its corresponding bolt 30'.

According to the structure for preventing the falling of the fastening nut in accordance with the second embodiment with the aforementioned configuration, it is possible to not only obtain the substantially same operational effects as those in the first embodiment, reduce the weight and simplify a portion around the structure for preventing the falling of the fastening nut, but also perform the operation of attaching the nut 40' with the anchoring cylindrical portion 45', which forms the nut anchor member, to the cover 20' more easily.

Although the nut locking member is provided with three leg-like piece portions in each of the first and second embodiments, the number of the leg-like piece portions may be two, for example, and the leg-like piece portions may also be replaced by a thin cylindrical portion. When a thin cylindrical portion is provided (that is, when a nut locking member with a thin cylindrical shape is disposed), the thin cylindrical portion may be provided with six vertical straight cut lines so as to be split into six leg-like piece portions, for example, and thus allow the thin cylindrical portion to be easily warped inside, and in such a case, the number, width, shape, and the like of the cut lines may be appropriately set so that elasticity that is necessary for the attachment is obtained.

Although the first and second embodiments each have illustrated a chain saw as an example of the portable power working machine, it is needless to mention that the present invention is not limited thereto, and thus the present invention can be applied to any portable power working machine as long as it is of a type in which a guide bar is compressively held between a body portion and a cover, such as a pole pruner with a chain saw unit attached to the tip end of a bush cutting operation pole, and an electric cutter.

DESCRIPTION OF SYMBOLS

12 Body portion
15 Guide bar
20 Cover
25 Seat
28 Bolt insertion hole
30 Bolt
35 Male screw thread portion
40 Nut
40c Seating Surface
42 Female screw thread portion
45 Anchoring cylindrical portion (Nut anchor member)
46 Hook portion
50 Nut locking member
52 Flange portion for preventing the falling of the nut locking member
55 Leg-like piece portion
56 Locking claw portion

What is claimed is:

1. A structure for preventing the falling of a fastening nut of a portable power working machine including a body portion, a cover attached to cover a predetermined region of the body portion, a guide bar held between the body portion and the cover, a bolt passed through an elongated hole or an elongated groove provided in the guide bar and through a bolt insertion hole provided in the cover, the bolt being securely embedded in the body portion, and a fastening nut threadably engaged with the bolt so as to compressively hold the guide bar between the body portion and the cover, the structure comprising:

a nut locking member, the nut locking member being elastically deformable split cylindrical shape and adapted to be inserted through the bolt insertion hole from a back surface side of the cover so that movement of the nut locking member to a front surface side is prevented; and a nut anchor member provided on the nut on a seating surface side thereof, the nut anchor member being adapted to be inserted through the bolt insertion hole and being relatively difficult to elastically deform with respect to the nut locking member, wherein:

the nut anchor member includes a hook portion formed continuous therewith, and the nut locking member includes at least one locking claw portion formed continuous therewith, the locking claw portion being adapted to allow the hook portion to be locked by the nut locking member.

2. The structure for preventing the falling of a fastening nut according to claim 1, wherein the nut locking member has a split cylindrical shape with a plurality of leg piece portions, and each leg piece portion has formed at an end thereof the locking claw portion.

3. The structure for preventing the falling of a fastening nut according to claim 2, wherein each leg piece portion of the nut locking member is adapted to be opposite and in contact with the bolt.

4. The structure for preventing the falling of a fastening nut according to claim 1, wherein the nut locking member has a step formed thereon, and the nut anchor member is adapted to be externally arranged on a smaller-diameter portion of the nut locking member.

5. The structure for preventing the falling of a fastening nut according to claim 1, wherein an end of the nut locking member is located at the same height as an end of the bolt insertion hole on the front surface side.

6. The structure for preventing the falling of a fastening nut according to claim 1, wherein an end of the nut locking member is adapted to protrude upward beyond an end of the bolt insertion hole on the front surface side.

7. The structure for preventing the falling of a fastening nut according to claim 1, wherein an end of the nut locking member on a back surface side has formed thereon a flange portion for preventing the falling of the nut locking member, the flange portion having a larger diameter than a minimum inner diameter of the bolt insertion hole.

8. The structure for preventing the falling of a fastening nut according to claim 1, wherein the nut locking member is fixed to the cover.

9. The structure for preventing the falling of a fastening nut according to claim 1, wherein each of the hook portion and the locking claw portion has one of an L-shaped, chevron-shaped, or arcuate cross-section.

10. The structure for preventing the falling of a fastening nut according to claim 1, wherein the nut anchor member is adapted to slide on an inner peripheral surface of the bolt insertion hole when the nut is loosened or fastened.

11. A structure for preventing the falling of a fastening nut of a portable power working machine including a body portion, a cover attached to cover a predetermined region of the body portion, a guide bar held between the body portion and the cover, a bolt passed through an elongated hole or an elongated groove provided in the guide bar and through a bolt insertion hole provided in the cover, the bolt being securely embedded in the body portion, and a fastening nut threadably engaged with the bolt so as to compressively hold the guide bar between the body portion and the cover, the structure comprising:

a nut locking member, the nut locking member having an elastically deformable split cylindrical shape, and being adapted to be inserted through the bolt insertion hole from a back surface side of the cover so that movement of the nut locking member to a front surface side is prevented; and an anchoring cylindrical portion with a predetermined length functioning as a nut anchor member, the anchoring cylindrical portion being provided in a protruding manner and coaxially with the nut on a seating surface side, being adapted to be inserted through the bolt insertion hole, and being relatively difficult to elastically deform with respect to the nut locking member, wherein:

a protruding end of the anchoring cylindrical portion of the nut has formed continuous therewith a hook portion that bends inward along its entire periphery, and an end of the nut locking member has formed continuous therewith at least one locking claw portion that bends outward to lock the hook portion.

* * * * *